United States Patent [19]

Padden

[11] Patent Number: 5,199,853

[45] Date of Patent: Apr. 6, 1993

[54] PNEUMATIC FLOW CONTROL SYSTEM

[76] Inventor: Harvey F. Padden, 5 Iron Forge South, Pompton Lakes, N.J. 07442

[21] Appl. No.: 660,888

[22] Filed: Feb. 26, 1991

[51] Int. Cl.$^5$ ............................................. F04B 45/06
[52] U.S. Cl. ..................................... 417/43; 417/53; 417/295
[58] Field of Search ............... 417/53, 43, 295, 279; 73/863.03, 863.23, 863.02

[56] References Cited

U.S. PATENT DOCUMENTS

| | | | |
|---|---|---|---|
| 4,269,059 | 5/1981 | Baker | 73/863.03 |
| 4,532,814 | 8/1985 | Lalin | 73/863.23 |
| 4,576,054 | 3/1986 | Lalin | 73/863.23 |
| 5,000,052 | 3/1991 | Sipin | 73/863.03 |

*Primary Examiner*—Richard A. Bertsch
*Assistant Examiner*—David W. Scheuermann
*Attorney, Agent, or Firm*—Ostrolenk, Faber, Gerb & Soffen

[57] ABSTRACT

A fluid flow control system maintains a constant, controllable, low flow rate through an orifice; intermittently operates a pump at an efficient, relatively high flow rate; and moderates flow between the pump and the orifice. The system is energy efficient and accurate.

35 Claims, 1 Drawing Sheet

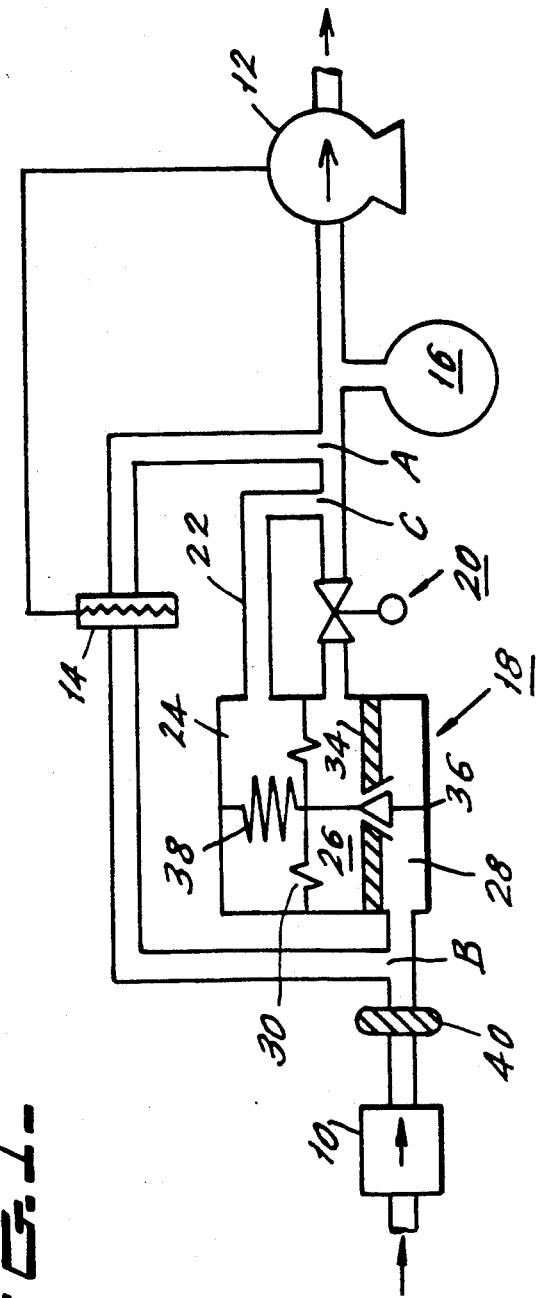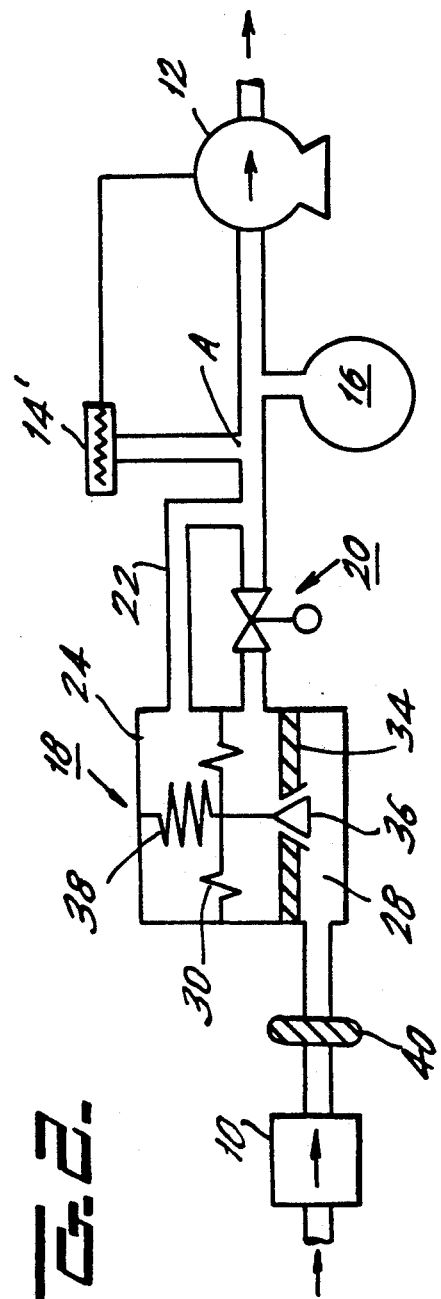

PNEUMATIC FLOW CONTROL SYSTEM

BACKGROUND OF THE INVENTION

The present invention relates to a pneumatic flow control system for maintaining a constant, low flow rate, particularly a system for drawing air through a sampling device at a constant, controllable, low flow rate.

Prior art systems for drawing air through a sampling device are disclosed in U.S. Pat. Nos. 4,904,987, 4,896,548, 4,747,315, 4,576,054, 4,532,814, 4,527,953, 4,432,248, 4,269,059, 4,257,746, 4,123,932 and 4,063,824. In some of these systems, a constant, low flow rate is not maintained. In others, a constant, low flow rate is achieved by controlling the speed of a pump and/or by shunting air around a pump. The prior art systems have proven to be less than fully satisfactory.

SUMMARY OF THE INVENTION

An object of the present invention to provide a pneumatic flow control system for maintaining a constant, low flow rate, with improved efficiency and accuracy.

Thus, the present invention relates to a fluid flow control system which includes: (A) a flow control orifice; (B) differential pressure maintaining means for maintaining a constant, low pressure differential between (1) the pressure at a first location which is upstream from the orifice and (2) the pressure at a second location which is downstream from the orifice, and for thereby maintaining a constant, low flow rate through the orifice; (C) a pump for causing fluid to flow through the orifice, the pump being operable at an efficient, relatively high flow rate; (D) moderating means for moderating flow through the system, the moderating means being located between the pump and a third location which is downstream from the orifice; and (E) means for intermittently operating the pump as a function of the difference in pressure between (1) the pressure at the third location and (2) a reference pressure.

Other features and advantages of the present invention will become apparent from the following detailed description of preferred embodiments of the invention, with reference to the accompanying drawings.

BRIEF DESCRIPTION OF THE DRAWINGS

FIG. 1 is an illustration of a fluid flow control system in accordance with the present invention; and FIG. 2 is an illustration of another fluid flow control system in accordance with the present invention.

DETAILED DESCRIPTION OF THE PREFERRED EMBODIMENTS

Referring now to the drawings, wherein like reference numerals indicate like elements, there is shown in FIG. 1 a system for drawing gas through a sampling device 10 at a controlled, low flow rate.

Suction for drawing the gas through the system is provided by a pump 12. The pump 12 may be an AC pump, a rotary pump, a vibrating pump or the like. Significantly, the capacity of the pump 12 is greater than that needed to maintain the desired low flow rate for the system. The pump 12 is very efficient at this relatively high capacity. However, if the pump 12 were operated continuously, it would draw gas through the system at too high of a rate. Therefore, in the present invention, to obtain the low flow rate which is desired at the filter 10, the pump 12 is operated intermittently. The overall energy efficiency of the system is increased as a result.

The intermittent operation of the pump 12 is controlled by a pressure responsive sensor or pressure actuated switch 14. The switch 14 is responsive to the difference in pressure between the pressure at point A and a reference pressure at point B. The pressure at point A fluctuates with the intermittent operation of the pump 12. That is, the pressure at point A decreases while the pump 12 is on, and increases while the pump 12 is off. When the difference in pressure between points A and B is reduced to a predetermined minimum differential pressure, the switch 14 turns the pump 12 on, causing the pressure at point A to decrease. When the difference in pressure between points A and B reaches a predetermined maximum, the switch 14 turns the pump 12 off, causing the pressure at point A to increase. The pressure at point B is the most meaningful reference pressure because that is the pressure applied to the outlet from the sampling device 10.

The sensor or switch 14 may have a pulse stretching circuit for providing time hysteresis in the signal to the pump 12. This way, any signal from the switch 14 is extended for a certain period of time. This way, the pump 12 is neither on nor off for inefficiently short periods of time. Suitable timing devices, such as an ML355, for providing time signal hysteresis are known to those in the art.

The functional relationship between the pressure at point A and the pressure immediately adjacent the inlet to the pump 12 is moderated substantially by a reservoir 16. The reservoir 16 may be provided solely for the purpose of moderating the pressure response at point A, or the reservoir 16 may simply consist of the system's tubing between point A and the pump 12.

A constant, controllable, low flow rate through the system is maintained by a throttling pressure regulator 18, a flow control orifice 20 and a feedback vent 22.

The throttling pressure regulator 18 may be formed of three chambers 24, 26 and 28, a movable partition 30 for separating the chambers 24 and 26, a fixed partition 32 for separating the chambers 26 and 28, a throttling orifice 34, a valve element 36 for changing the effective area of the orifice 34, and a spring 38 for biasing the element 36 to open position. The valve element 36 moves with the partition 30. Thus, the element 36 controls the flow of gas through the throttling orifice 34 as a function of the difference in pressure between the chambers 24 and 26, and as a function of the flow rate through the throttling orifice 34. An example of a throttling pressure regulator which may be used with the present invention is disclosed in U.S. Pat. No. 3,534,784.

The vent 22 provides fluid communication between the chamber 24 and point C (which is immediately downstream from the flow control orifice 20), such that the pressure within chamber 24 is essentially equal to the pressure at point C. Point C is close to point A. Therefore, the pressure at point C is maintained within a range relative to the reference pressure at point B.

In operation, an increase in pressure within chamber 28 relative to the pressure within chamber 26 tends to close the throttling orifice 34. An increase in pressure within chamber 26 relative to the pressure within chamber 24 (and therefore also at the points C and A) also tends to close the throttling orifice 34. As a result, a constant difference in pressure is maintained across the flow control orifice 20 (i.e., between the chamber 26 and point C). Since there is a constant pressure differential across the orifice 20, there is a constant rate of flow through the orifice 20.

The flow control orifice 20 may have a fixed effective flow area or it may be adjustable. In the preferred embodiment, the orifice 20 is an adjustable needle valve.

The flow rate through the system may be measured by a suitable flow meter (not illustrated).

The sampling device 10 may include adsorbent or absorbent material for taking samples of air drawn therethrough. The sampling device 10 may have a variable resistance to flow. Further, the device 10 may be replaced by another sampling device with a different resistance to flow.

Reference numeral 40 indicates a filter for protecting the throttling pressure regulator 18, flow control orifice 20 and pressure switch 14.

In an alternative embodiment illustrated in FIG. 2, the reference pressure for the pressure actuated switch 14' is ambient pressure. The operation of the alternative embodiment is otherwise the same as that of the embodiment illustrated in FIG. 1.

The present invention can be used to draw fluid through a plurality of sampling devices 10, with a regulator 18, orifice 20 and vent 22 being provided for each sampling device 10. The operation of a single pump 12 may be controlled by respective switches 14 (one for each sampling device 10) and/or a single switch 14'. Fluid can be selectively (e.g., sequentially or according to a program) drawn through one or more of the sampling devices 10 by a suitable valve system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of operating a fluid flow control system, comprising the steps of:
   intermittently operating a pump at an efficient relatively high flow rate, and thereby causing fluid to flow through a flow control orifice, wherein the pump is operated intermittently as a function of the difference in pressure between (1) the pressure at a first location which is downstream from the flow control orifice and (2) a reference pressure;
   maintaining a constant pressure differential across the flow control orifice, and thereby causing the fluid to flow through the flow control orifice at a constant, relatively low flow rate; and
   moderating flow through the system between the pump and the first location.

2. The method of claim 1, wherein the step of intermittently operating the pump includes the steps of generating a signal for controlling the pump, and extending the signal for a certain period of time.

3. The method of claim 1, wherein the reference pressure is the pressure at a location which is upstream from the flow control orifice.

4. The method of claim 1, further comprising the step of drawing the fluid through a sampling device.

5. The method of claim 4, wherein the reference pressure is ambient pressure.

6. A fluid flow control system, comprising:
   a flow control orifice;
   a pump for causing fluid to flow through the flow control orifice, the pump being operable at an efficient, relatively high flow rate;
   a differential pressure maintaining means for maintaining a constant, low pressure differential between (1) the pressure at a first location which is upstream from the flow control orifice and (2) the pressure at a second location which is downstream from the flow control orifice, and for thereby maintaining a constant, low flow rate through the flow control orifice;
   moderating means for moderating flow through the system, the moderating means being located between the pump and the second location; and
   means for intermittently operating the pump as a function of the difference in pressure between (1) the pressure at the second location and (2) a reference pressure.

7. The system of claim 6, wherein the moderating means includes a reservoir.

8. The system of claim 6, wherein the flow control orifice is adjustable.

9. The system of claim 6, wherein the differential pressure maintaining means includes (1) a throttling pressure regulator and (2) a feedback vent for controlling the regulator as a function of the pressure at the second location.

10. The system of claim 9, wherein the throttling pressure regulator includes a first chamber, a second chamber and a third chamber, a movable partition for separating the first chamber from the second chamber and a fixed partition for separating the second chamber from the third chamber, the fixed partition having a throttling orifice therein for providing fluid communication between the third chamber and the second chamber;
   wherein the regulator further includes a valve element for controlling flow through the throttling orifice, the valve element being operatively associated with the movable and fixed partitions so as to control fluid flow through the throttling orifice as a function of the pressure differential between (1) the pressure in the first chamber and (2) the pressure in the second chamber, and as a function of the flow rate through the throttling orifice; and
   wherein the vent provides fluid communication between the second location and the first chamber.

11. The system of claim 6, wherein the means for intermittently operating the pump includes a pressure actuated switch, whereby the pump is operated at the relatively high flow rate when the difference in pressure between (1) the pressure at the second location and (2) the reference pressure is less than a minimum pressure difference, and whereby the pump is not operated when the difference in pressure exceeds a maximum pressure difference.

12. The system of claim 9, wherein the reference pressure is the pressure at a location which is upstream from the flow control orifice.

13. The system of claim 9, wherein the reference pressure is ambient pressure.

14. A method of operating a fluid flow control system, comprising the steps of:
   intermittently operating a pump at an efficient, relatively high flow rate, and thereby causing fluid to flow through a flow control orifice, wherein the pump is operated intermittently as a function of the different in pressure between (1) the pressure at a first location which is downstream from the flow control orifice and (2) a reference pressure; and maintaining a constant pressure differential across the flow control orifice, and thereby causing the fluid to flow through the flow control orifice at a constant, relatively low flow rate.

15. The method of claim 14, further comprising the step of drawing the fluid through a sampling device.

16. The method of claim 14, wherein the reference pressure is the pressure at a location which is upstream from the flow control orifice.

17. The method of claim 14, wherein the reference pressure is ambient pressure.

18. A fluid flow control system, comprising:
a flow control orifice;
a pump for causing fluid to flow through the flow control orifice, the pump being operable at an efficient, relatively high flow rate;
a differential pressure maintaining means for maintaining a constant, low pressure differential between (1) the pressure at a first location which is upstream from the flow control orifice and (2) the pressure at a second location which is downstream from the flow control orifice, and for thereby maintaining a constant, low flow rate through the flow control orifice; and
means for intermittently operating the pump as a function of the different in pressure between (1) the pressure at a second location and (2) a reference pressure.

19. The system of claim 18, wherein the reference pressure is ambient pressure.

20. The system of claim 18, wherein the reference pressure is the pressure at a location which is upstream from the flow control orifice.

21. The system of claim 18, wherein the differential pressure maintaining means includes (1) a throttling pressure regulator and (2) a feedback vent for controlling the regulator as a function of the pressure at the second location.

22. The system of claim 21, wherein the throttling pressure regulator includes a first chamber, a second chamber and a third chamber, a movable partition for separating the first chamber from the second chamber and a fixed partition for separating the second chamber from the third chamber, the fixed partition having a throttling orifice therein for providing fluid communication between the third chamber and the second chamber;
wherein the regulator further includes a valve element for controlling flow through the throttling orifice, the valve element being operatively associated with the movable and fixed partitions so as to control fluid flow through the throttling orifice as a function of the pressure differential between (1) the pressure in the first chamber and (2) the pressure in the second chamber, and as a function of the flow rate through the throttling orifice; and
wherein the vent provides fluid communication between the second location and the first chamber.

23. A method of operating a fluid flow control system for maintaining a constant fluid flow rate through an inlet, comprising the steps of:
(a) providing a flow control orifice downstream from the inlet and in series fluid communication with the inlet;

(b) providing a pump in fluid communication with the flow control orifice and the inlet, and operating the pump; and (c) maintaining a constant pressure differential between (1) a first location which is upstream from the flow control orifice and (2) a second location which is downstream from the flow control orifice, said pump thereby maintaining a constant fluid flow rate through said flow control orifice and said inlet; wherein step (c) includes the steps of:
(1) locating a pressure regulator in series fluid communication between said first location and said flow control orifice; and
(2) feeding back a pressure at said second location to said pressure regulator to control the pressure regulator as a function of the pressure at the second location.

24. The method of claim 23, further comprising the step of moderating flow through the system.

25. The method of claim 23, wherein said fluid flow is due exclusively to said pump and no other pressure source is connected to the system.

26. The method of claim 23, wherein said pump is downstream from said flow control orifice.

27. A fluid control system for maintaining a constant fluid flow rate through a flow control orifice, comprising:
a pump;
a flow control orifice in series fluid communication with said pump; and
differential pressure maintaining means in series fluid communication with said pump and said flow control orifice for maintaining a constant pressure differential between (1) a first location which is upstream from the flow control orifice and (2) a second location which is downstream from the flow control orifice, thereby enabling said pump to maintain a constant fluid flow rate through the flow control orifice.

28. The system of claim 27, further comprising means for moderating flow through the system.

29. The system of claim 27, wherein said fluid flow is due exclusively to said pump and no other pressure source is connected to the system.

30. The system of claim 27, wherein said pump is downstream from said flow control orifice.

31. The system of claim 27, wherein the differential pressure maintaining means includes (1) a pressure regulator in series with said pump and said flow control orifice, and (2) feedback means for controlling the regulator as a function of the pressure at the second location.

32. A fluid control system for maintaining a constant fluid flow rate through a flow control orifice, comprising:
a pump;
a flow control orifice in fluid communication with said pump; and
differential pressure maintaining means in fluid communication with said pump and said flow control orifice for maintaining a constant pressure differential between (1) a first location which is upstream from the flow control orifice and (2) a second location which is downstream from the flow control orifice, thereby enabling said pump to maintain a constant fluid flow rate through the flow control orifice;
wherein the differential pressure maintaining means includes (1) a pressure regulator, and (2) feedback means for controlling the regulator as a function of the pressure at the second location;

wherein said pressure regulator has an inlet chamber and a first chamber which are separated by a movable partition, said inlet chamber being connected to said first location and to said flow control orifice, and said first chamber being connected to said second location by a feedback vent of said feedback means to feed back said pressure at said second location to said first chamber.

33. The system of claim 32, wherein the inlet chamber includes a second chamber and a third chamber, said movable partition separating the first chamber from the second chamber and a fixed partition separating the second chamber from the third chamber, the fixed partition having a throttling orifice therein for providing fluid communication between the third chamber and the second chamber;

wherein the regulator further includes a valve element for controlling flow through the throttling orifice, the valve element being operatively associated with the movable and fixed partitions so as to control fluid flow through the throttling orifice as a function of the pressure differential between (1) the pressure in the first chamber and (2) the pressure in the second chamber, and as a function of the flow rate through the throttling orifice.

34. A method of operating a fluid flow control system for maintaining a constant fluid flow rate through an inlet, comprising the steps of:
(a) providing a flow control orifice downstream from the inlet and in fluid communication with the inlet;
(b) providing a pump in fluid communication with the flow control orifice and the inlet, and operating the pump; and
(c) maintaining a constant pressure differential between (1) a first location which is upstream from the flow control orifice and (2) a second location which is downstream from the flow control orifice, said pump thereby maintaining a constant fluid flow rate through said flow control orifice and said inlet; wherein step (c) includes the steps of:
(1) locating a pressure regulator in fluid communication between said first location and said flow control orifice; and
(2) feeding back a pressure at said second location to said pressure regulator to control the pressure regulator as a function of the pressure at the second location; and further comprising the step of providing said pressure regulator with an inlet chamber and a first chamber which are separated by a movable partition, said inlet chamber being connected to said first location and to said flow control orifice, and said first chamber being connected to said second location by a feedback vent so as to feed back said pressure at said second location to said first chamber.

35. The method of claim 25, further comprising the step of providing the inlet chamber with a second chamber and a third chamber, said movable partition separating the first chamber from the second chamber and a fixed partition separating the second chamber from the third chamber, the fixed partition having a throttling orifice therein for providing fluid communication between the third chamber and the second chamber; and further providing the regulator with a valve element for controlling flow through the throttling orifice, the valve element being operatively associated with the movable and fixed partitions so as to control fluid flow through the throttling orifice as a function of the pressure differential between (1) the pressure in the first chamber and (2) the pressure in the second chamber, and as a function of the flow rate through the throttling orifice.

* * * * *